United States Patent
Oka

(10) Patent No.: US 6,750,861 B2
(45) Date of Patent: Jun. 15, 2004

(54) INFORMATION PROCESSING DEVICE AND METHOD THEREOF, AND TRANSMISSION MEDIUM

(75) Inventor: Masaaki Oka, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 18 days.

(21) Appl. No.: 10/366,984

(22) Filed: Feb. 14, 2003

(65) Prior Publication Data

US 2003/0122817 A1 Jul. 3, 2003

Related U.S. Application Data

(63) Continuation of application No. 09/153,281, filed on Sep. 15, 1998.

(30) Foreign Application Priority Data

Sep. 17, 1997 (JP) .............................................. 9-252093

(51) Int. Cl.[7] .............................................. G06T 17/00
(52) U.S. Cl. ....................................................... 345/419
(58) Field of Search ................................. 345/418, 419, 345/420, 421, 423, 424, 427

(56) References Cited

U.S. PATENT DOCUMENTS

| | | | |
|---|---|---|---|
| 5,977,977 A | 11/1999 | Kajiya et al. | |
| 6,088,034 A | 7/2000 | Deering | |
| 6,137,492 A | 10/2000 | Hoppe | |
| 6,239,805 B1 | 5/2001 | Deering | |
| 6,252,608 B1 | 6/2001 | Snyder et al. | |

*Primary Examiner*—Cliff N. Vo
(74) *Attorney, Agent, or Firm*—Frommer Lawrence & Haug LLP; William S. Frommer; Gordan Kessler

(57) ABSTRACT

Processing at high speed is realized. Interpolation is carried out between vertexes of a series of vertexes and a series of vertexes taken as a longer series of vertexes of a strip. Interpolation is then carried out between each vertex of the interpolated series of vertexes and corresponding vertexes. Sub-strips are then generated using each of the interpolated vertexes. In this way, processing can be carried out at high speed after finely subdividing.

12 Claims, 18 Drawing Sheets

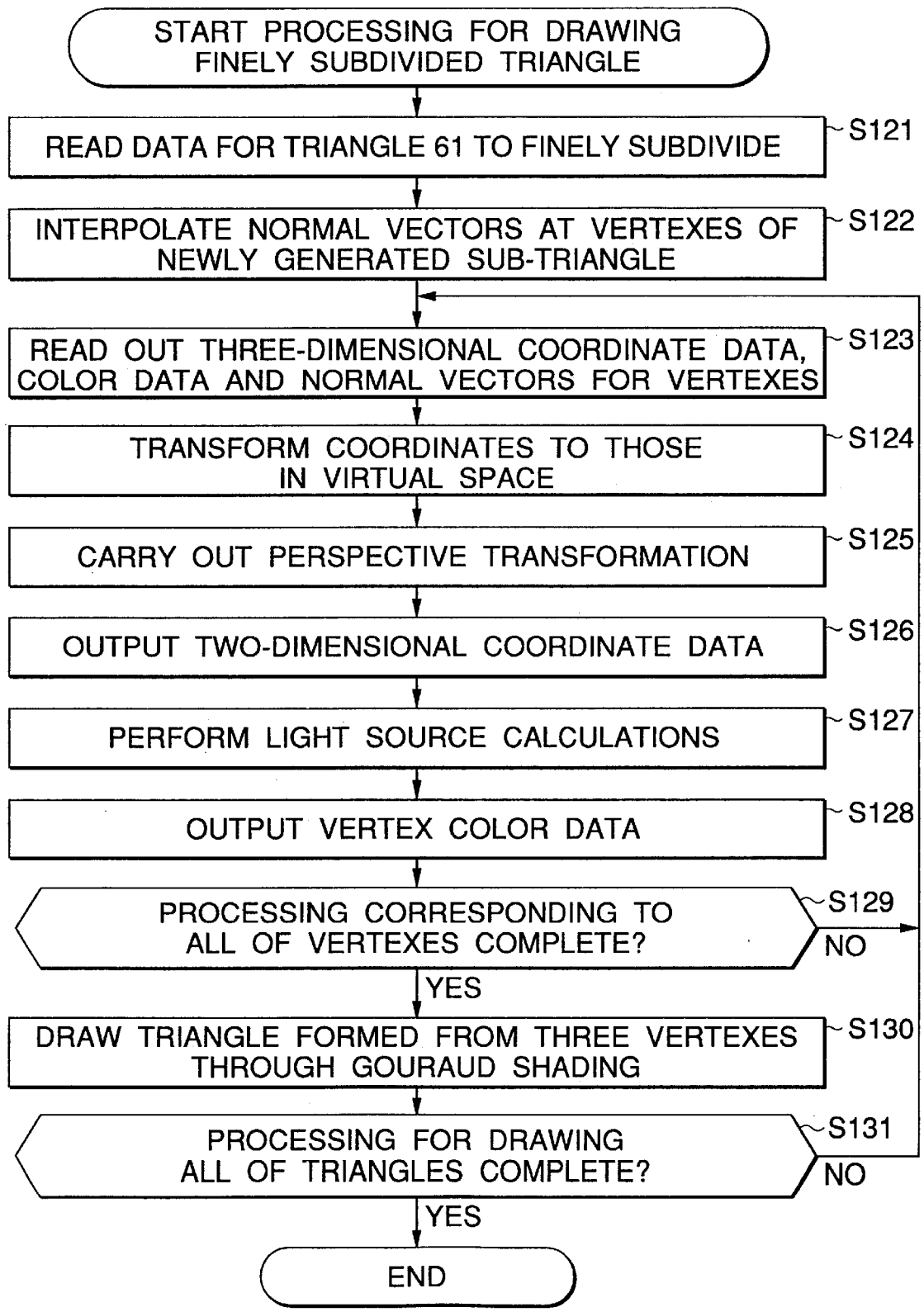

INFORMATION PROCESSING DEVICE AND METHOD THEREOF, AND TRANSMISSION MEDIUM

CROSS REFERENCE TO RELATED APPLICATION

This is a continuation of copending U.S. patent application Ser. No. 09/153,281, filed Sep. 15, 1998.

BACKGROUND OF THE INVENTION

The present invention relates to an information processing device and method thereof, and a transmission medium, and more particularly relates to an information processing device and method thereof and a transmission medium by which an amount of information for an object to be processed is reduced in such a manner that processing can be carried out at high speed.

With information processing devices such as computer games, various three-dimensional figures (objects) are represented, with the objects being possible to be changed in various states. FIG. 1 is a block diagram showing an example of a configuration of such kind of information processing device. In this example, a CPU 11 carries out various calculations such as coordinate transformations, light source calculations or vector arithmetics etc., as well as controlling of each part. Further, to the CPU 11, there are connected a main bus 12 that carries out data transfer at a comparatively high speed and a sub-bus 13 that carries out the data transfer at a comparatively low speed, via which data can be exchanged. A CD-ROM drive 14 is connected to the sub-bus 13 so that various data or programs can be read out from a CD-ROM as a recording media installed in the CD-ROM drive 14 using instructions of the CPU 11.

A main memory 15 and a GPU (Graphics Processing Unit) 16 are connected to the main bus 12. The main memory 15 stores data such as data read our from the CD-ROM driver 14 and data as computation results of the CPU 11. The GPU 16 reads out data from the main memory 15 as required, carries out rendering processing, and stores the processed data in a VRAM (Video Random Access Memory) 17 as pixel data. The GPU 16 further reads out pixel data stored in the VRAM 17 and supplies this data to a D/A converter 18. The D/A converter 18 converts the pixel data supplied from the GPU 16 from a digital signal to an analog signal for being outputted to a monitor (not shown) as a video signal.

With this kind of information processing device, a prescribed object is represented with triangular polygons as the units. One triangle is composed of three vertexes, and coordinate data for these three vertexes is therefore required as data representing this triangle. For example, as shown in FIG. 2, when a ribbon-shaped object 21 is formed from triangles 22—1 to 22—8 (in this drawing, each triangle is shown separately to make the description easier), if the data for each triangle is taken to be expressed as {Pa, Pb, Pc}, the data for this object 21 can be expressed as Triangle {P0, P1, P2}+Triangle {P1, P2, P3}+Triangle {P2, P3, P4}+Triangle {P3, P4, P5}+Triangle {P4, P5, P6}+Triangle {P5, P,6, P7}+Triangle {P6, P7, P8}+Triangle {P7, P8, P9}.

The number of items of data required to define an object formed using N triangles is therefore 3N.

On the other hand, as shown in FIG. 3, after, for example, the first triangle 22—1 is formed using vertexes P0, P1 and P2, the next triangle 22—2 can be formed if the vertex P3 is specified. The triangles for the following stages can then be expressed in a similar manner by sequentially specifying the vertexes P4 to P9 one at a time. This is to say that, with the exception of the first triangle 22—1, one triangle can be expressed using one vertex. Such a data format by which a figure (object 21) where triangles are linked in a ribbon shape is expressed as a series of successive points is referred to as a "Triangle Strip" (hereinafter abbreviated to "strip" according to situations). Data for an object 21 as a strip can then be expressed as a Triangle Strip {P0, P1, P2, P3, P4, P5, P6, P7, P8, P9}.

When an object 21 is defined using a series of successive points in this way, the number of items of required data is 3+(N−1)=N+2, and the amount of data (information) can be reduced compared with that in the case shown in FIG. 2.

Further, as shown in FIG. 4, a fan-shaped object 31 can be formed by making vertexes P1 to P5 correspond to vertex P0. In this case, one triangle can also be represented by one vertex as, Triangle Fan {P0, P1, P2, P3, P4, P5}. This kind of data format is referred to as a triangle fan (Triangle Fan) (hereinafter abbreviated to "fan" according to situations).

Incidentally, a single triangle can be drawn using data for coordinates for three vertexes, three vertex colors and three normal vectors. A description will now be given with reference to FIG. 5 of, for example, the process for drawing the object 21 shown in FIG. 3 with individual triangles taken as the units. First, in step S101, the CPU 11 reads out three-dimensional coordinate data, color data and a normal vector corresponding to a prescribed vertex of the three vertexes of one triangle from the main memory 15. In step S102, the read out three-dimensional coordinate data is transformed to coordinates in a virtual space.

In step S103, the CPU 11 carries out perspective transformation of the three-dimensional coordinate data that has been converted in step S102 into two-dimensional coordinate data. Namely, the three-dimensional coordinates of the triangle put in the virtual space are converted to coordinates for a state viewed in two dimensions (a state viewed on a monitor). Following this, in step S104, the CPU 11 outputs the two-dimensional coordinate data obtained in step S103 to the GPU 16.

In step S105, the CPU 11 calculates the luminance at each vertex from the position and direction of a light source in virtual space, with color data corresponding to the calculation results of step S105 being outputted to the GPU 16 in step S106.

In step S107, a determination is made as to whether or not processing for all (three) of the vertexes for one triangle is complete. When it is determined that there still exist vertexes that have not yet been processed, the process returns to step S101 and processing for the next vertex is carried out. When it is determined in step S107 that processing is complete for all of the vertexes, the process proceeds to step S108 to go to processing of the GPU 16.

In step S108, the GPU 16 draws the triangle formed by three vertexes through Gouraud shading with the data corresponding to the three vertexes supplied by the CPU 11. In step S109, a determination is made as to whether or not drawing for all of the triangles is complete (whether or not drawing of the object 21 is completed). When it is determined that there still exist triangles that have not yet been drawn (drawing of the object 21 is not completed), the process returns to step S101 and the same processing is carried out on other triangles of FIG. 3.

When it is determined in step S109 that drawing is complete for all of the triangles (drawing of the object 21 is complete), the processing is complete.

The processing occurring at the GPU 16 in step S108 will now be further described. For example, if normal vectors 51—1 to 51—3 at each vertex A, B and C of a triangle 61 to be processed are taken to be directed in directions shown in FIG. 6, a normal vector 51—4 at the center point D of the triangle 61 is interpolated by the GPU 16 from these normal vectors. The triangle 61 therefore has a bulge toward a central part. Therefore, when light giving illumination from a light source 41 is considered, as shown in FIG. 7, Gouraud shading has to be carried out in such a manner that the triangle 61 is brighter in the center part thereof and becomes darker toward the edges.

Gouraud shading, however, is processing that only interpolates color. Therefore, for example, when each vertex is given with the same color, the triangle 61 becomes completely painted out as shown in FIG. 8, and its accurate shape cannot be shown as a three-dimensional body. Processing for drawing is therefore carried out by finely subdividing the triangle 61 as shown in a flowchart of FIG. 9.

First, in step S121, the CPU 11 reads from the main memory 15 data for the triangle 61, which is then finely subdivided into a prescribed number (in this case, 16) of triangles (hereinafter referred to as sub-triangles for discrimination) as shown in FIG. 10A. In step S122, normal vectors for vertexes of newly generated sub-triangles are interpolated using normal vectors 51—1 to 51—3. Data for each vertex and normal vector thereof is then made to be temporarily stored in the main memory 15.

Next, processing of step S123 to step S130 is carried out but description thereof is omitted because this processing corresponds to that of step S101 to step S108 of FIG. 5. When the processing for step S123 to step S130 is complete, the process proceeds to step S131 and a determination is made as to whether or not drawing of all of the sub-triangles is complete. When it is determined that sub-triangles that have not been drawn still exist, the process returns to step S123 to go to processing for the next sub-triangle.

When it is determined in step S131 that processing for drawing all of the sub-triangles is complete, the processing comes to an end. The triangle 61 can therefore be expressed in more detail, as shown in FIG. 10B.

FIG. 11 shows an example of this method applied to a strip 71. In this example, triangles 81—1 to 81—8 forming the strip 71 are individually and finely subdivided into finer sub-triangles. In this case, each triangle (for example, 81—1) is divided into a total of 16 sub-triangles. This triangle 81—1 is then defined by sub-strips (sub-triangle strips) 91—1 to 91—4 with the number of the sub-triangles being 1, 3, 5 and 7, respectively, i.e. with the number of vertexes being 3, 5, 7 and 9, respectively, as shown in FIG. 12.

When a length N of the strip 71 of the series of vertexes of P0 to P9 is then defined as 10, the number of triangles comprising this strip 71 is N−2=8. Eight of sub-strips are therefore generated for each of lengths 3, 5, 7 and 9 after dividing. Because of this, if processing time for drawing on sub-triangle is taken to be T0 and time required for initialization setting of one sub-strip is taken to be T1, processing time T for drawing one strip becomes as follows. The processing time T0 changes depending on the area and shape of the triangle to be processed, but for convenience of the description, that processing time is assumed to be the same.

$$T = \{(T1 + T0 \times 1) + (T1 + T0 \times 3) + (T1 + T0 \times 5) + \quad (1)$$
$$(T1 + T0 \times 7)\} \times (N - 2)$$
$$= (4 \times T1 + 16 \times T0) \times (N - 2)$$
$$= T1 \times 4(N - 2) + T0 \times (16N - 32)$$

In this case, the number of vertexes possessed by a single triangle is 15. Therefore, when data for a strip of length N is stored, it is necessary to store information for all of the vertexes and the memory capacity required becomes 15× (N−2).

Similarly, as shown in FIG. 13, when a fan 101 of length N (=6) is finely subdivided, each of the triangles 111—1 to 111—4 forming the fan 101 is subdivided into sub-strips of lengths 3, 5, 7 and 9, with the number of N−2 (=4) for each. The processing time T for the triangle fan after fine subdividing can therefore also be given by equation (1).

Fine subdividing can therefore be carried out for a prescribed object.

However, the amount of information for the object after fine subdividing becomes large and processing time becomes long accordingly.

SUMMARY OF THE INVENTION

In view of the above, the present invention sets out to reduce the amount of information for an object to be processed and carry out processing at high-speed.

An object of the invention is to provide an information processing device wherein a plurality of first points defining first information are interpolated in such a manner as to generate second points and a plurality of pieces of second information defined by a plurality of the second points are generated, comprising:

interpolating means for interpolating the second points from the first points; and generating means for generating the second information by combining the second points interpolated by the interpolating means in a direction of length of the first information.

Another object of the invention is to provide an information processing method for an information processing device wherein a plurality of first points defining first information are interpolated in such a manner as to generate second points and a plurality of pieces of second information defined by a plurality of the second points are generated, comprising:

an interpolating step of interpolating the second points from the first points; and a generating step of generating the second information by combining the second points interpolated in the interpolating step in a direction of length of the first information.

A further object of the invention is to provide a transmission medium for transmitting a program employed by an information processing device wherein a plurality of first points defining first information are interpolated in such a manner as to generate second points and a plurality of pieces of second information defined by a plurality of the second points are generated, characterized by transmitting a program comprising:

an interpolating step of interpolating the second points from the first points; and a generating step of generating the second information by combining the second points interpolated in the interpolating step in a direction of length of the first information.

In the information processing device, the information processing method, and the transmission medium according to this invention, the second points are interpolated from the first points, to generate the second information by combining the second points in the direction of the length of the first information.

BRIEF DESCRIPTION OF THE DRAWINGS

FIG. 9 is a flowchart illustrating an example of processing for drawing a finely subdivided triangle;

DETAILED DESCRIPTION OF THE PREFERRED EMBODIMENTS

The following is a description of an embodiment of the present invention. In order to clarify the relationship between the means described in the scope of the appended and the following embodiments, the characteristics of the present invention are described as follows by adding the corresponding embodiment (but one example) shown in parenthesis after each means. This description of course by no means limits that described for each means.

The information processing device according to this invention comprises interpolating means (for example, step S3 of FIG. 14) for interpolating the second points from the first points and generating means (for example, step S4 of FIG. 14) for generating the second information by combining the second points interpolated by the interpolating means in the direction of the length of the first information.

Figure 1:
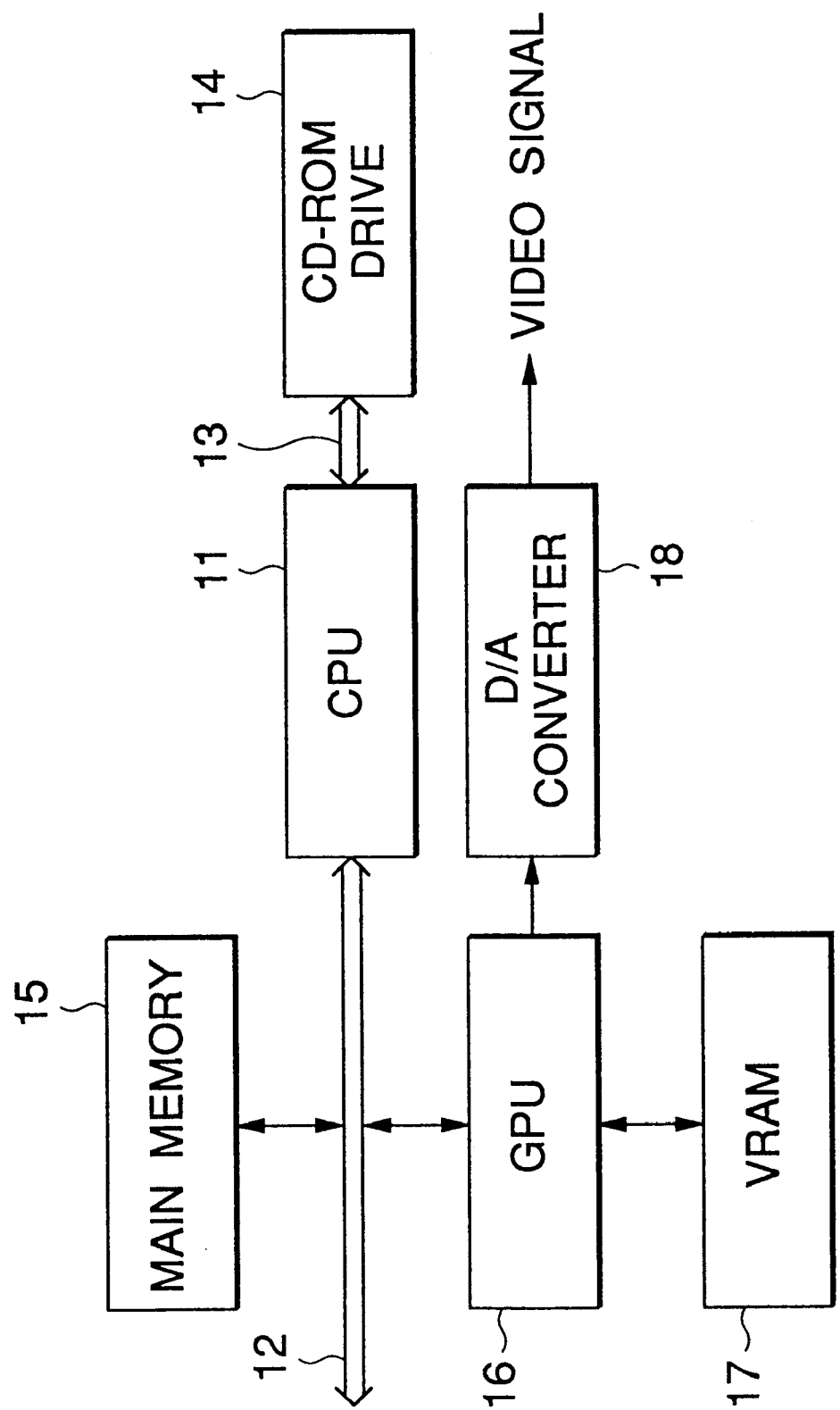
FIG. 1 is a block diagram showing an example of a configuration of an information processing device.
Figure 2:
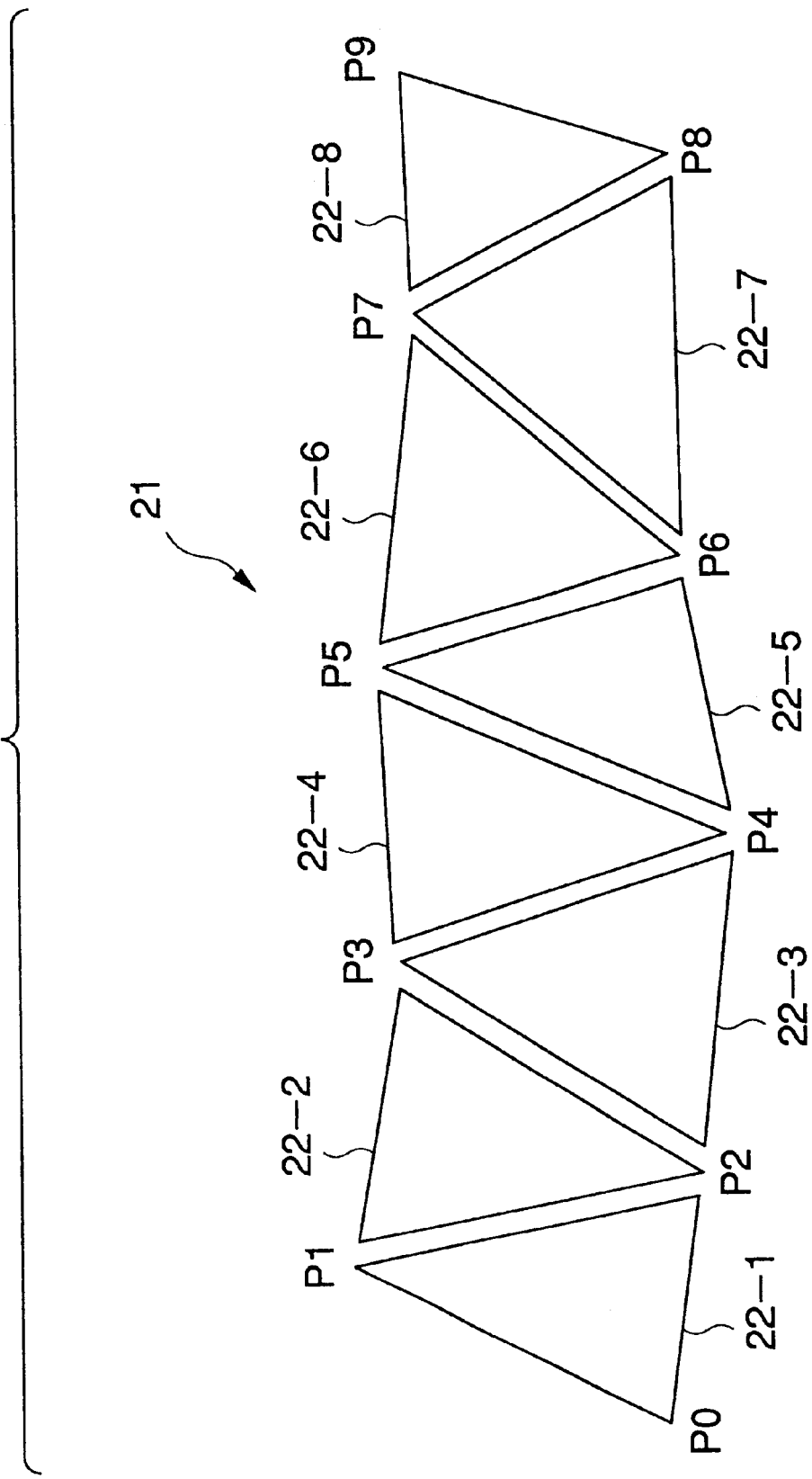
FIG. 2 is a view showing an object formed with triangles as the units.
Figure 3:
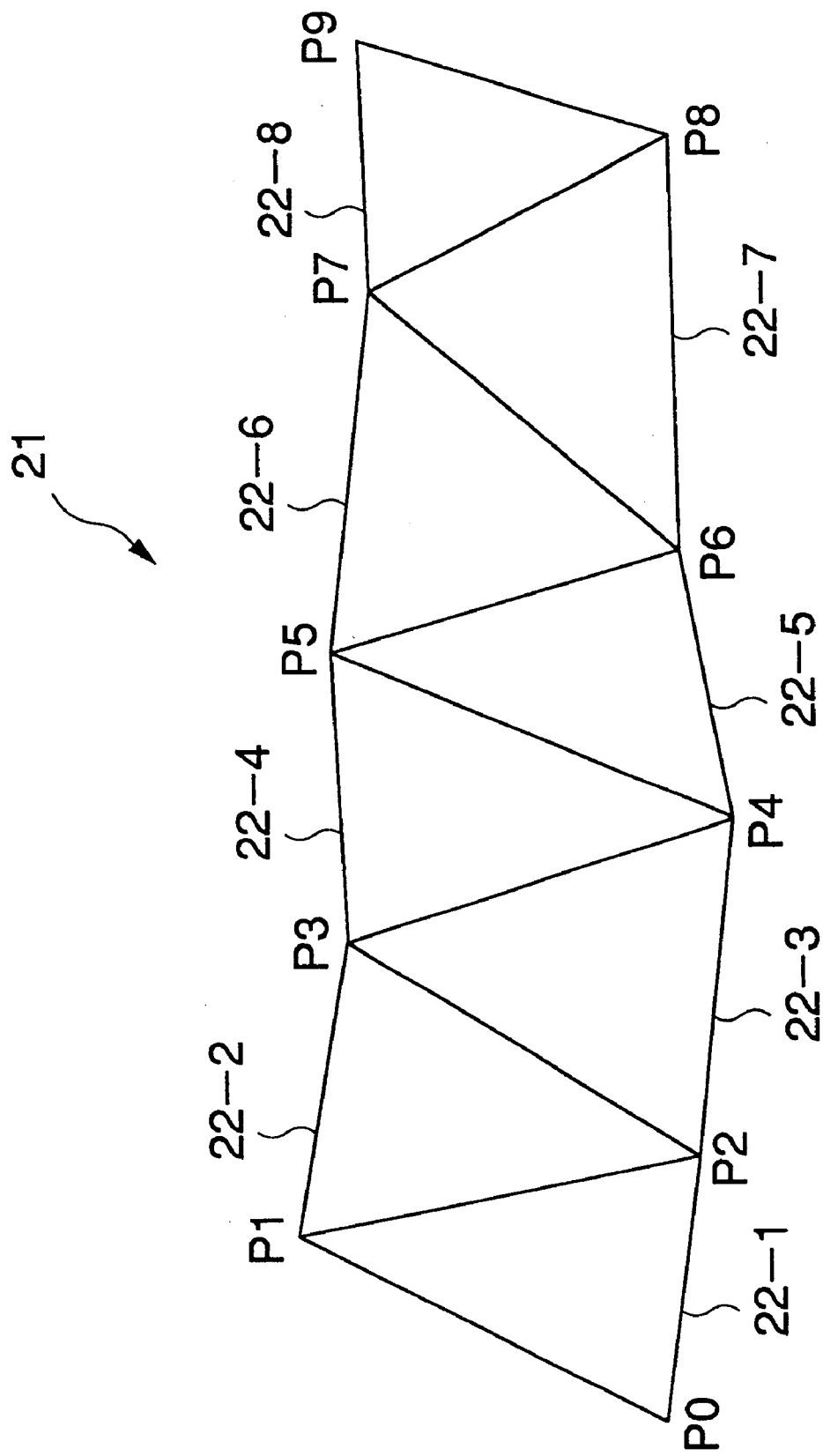
FIG. 3 is a view showing an object taken as a strip.
Figure 4:
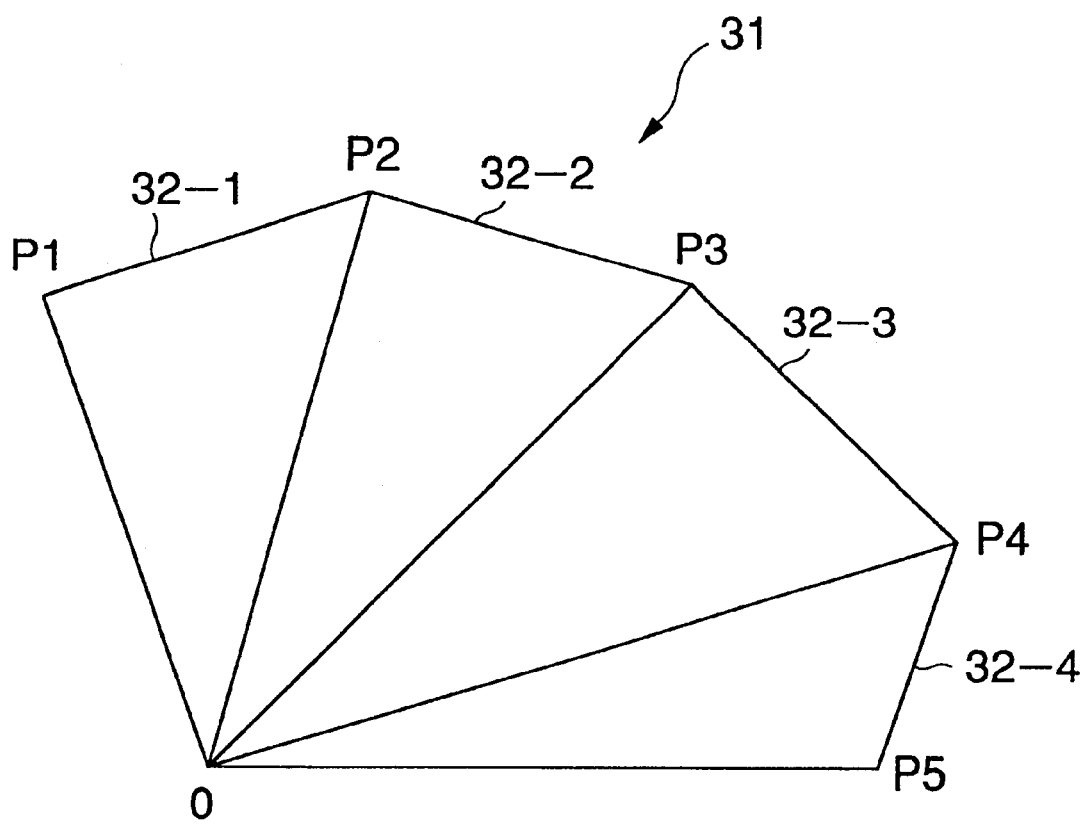
FIG. 4 is a view showing an object taken as a fan.
Figure 14:
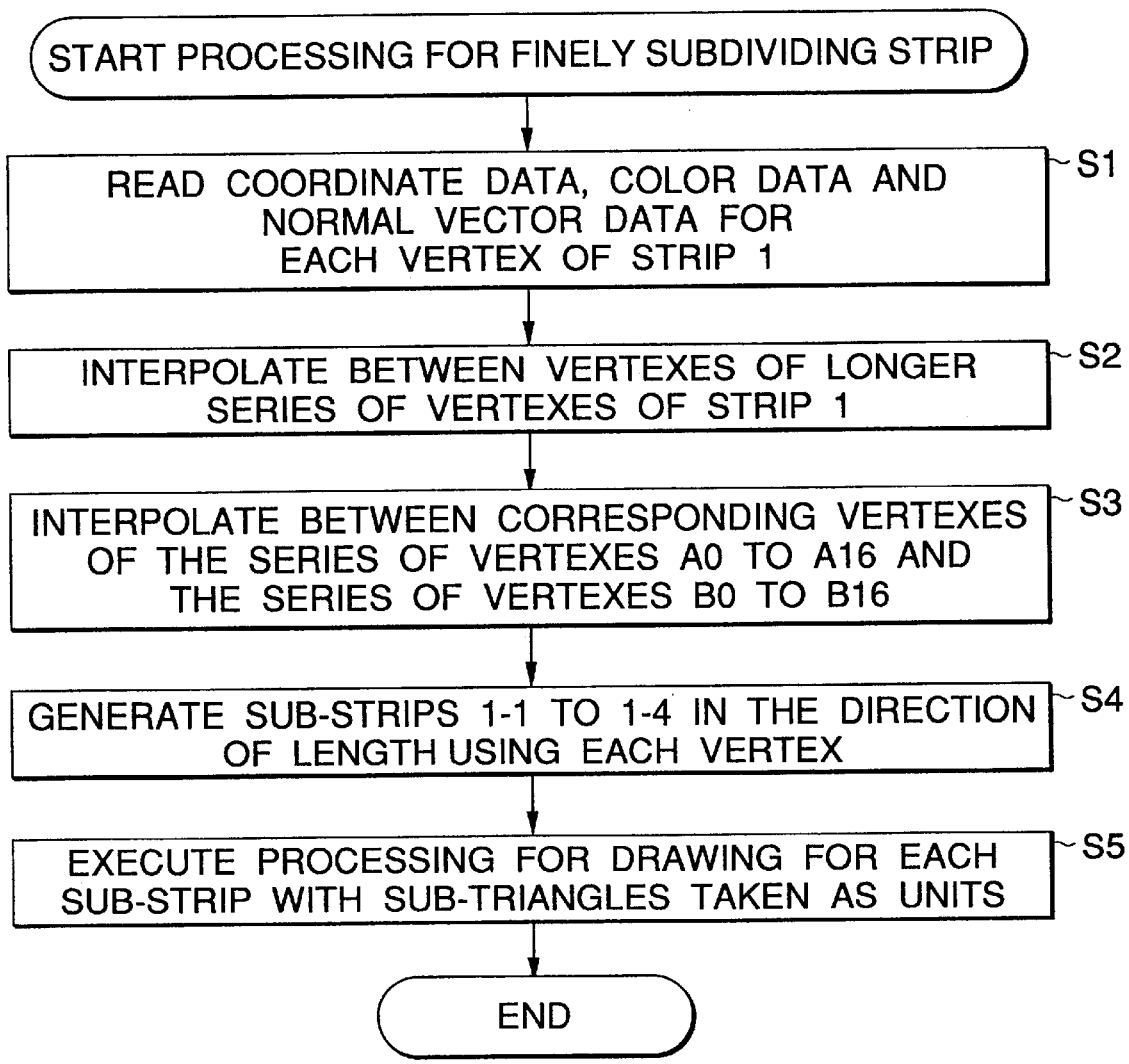
FIG. 14 is a flowchart illustrating an example of processing for finely subdividing a strip.

FIG. 14 is a flowchart illustrating processing for finely subdividing a strip in an information processing device to which the present invention is applied. The information processing device to which the present invention is applied has the same configuration as the case shown in FIG. 1 and the description thereof is therefore omitted.

Figure 15:
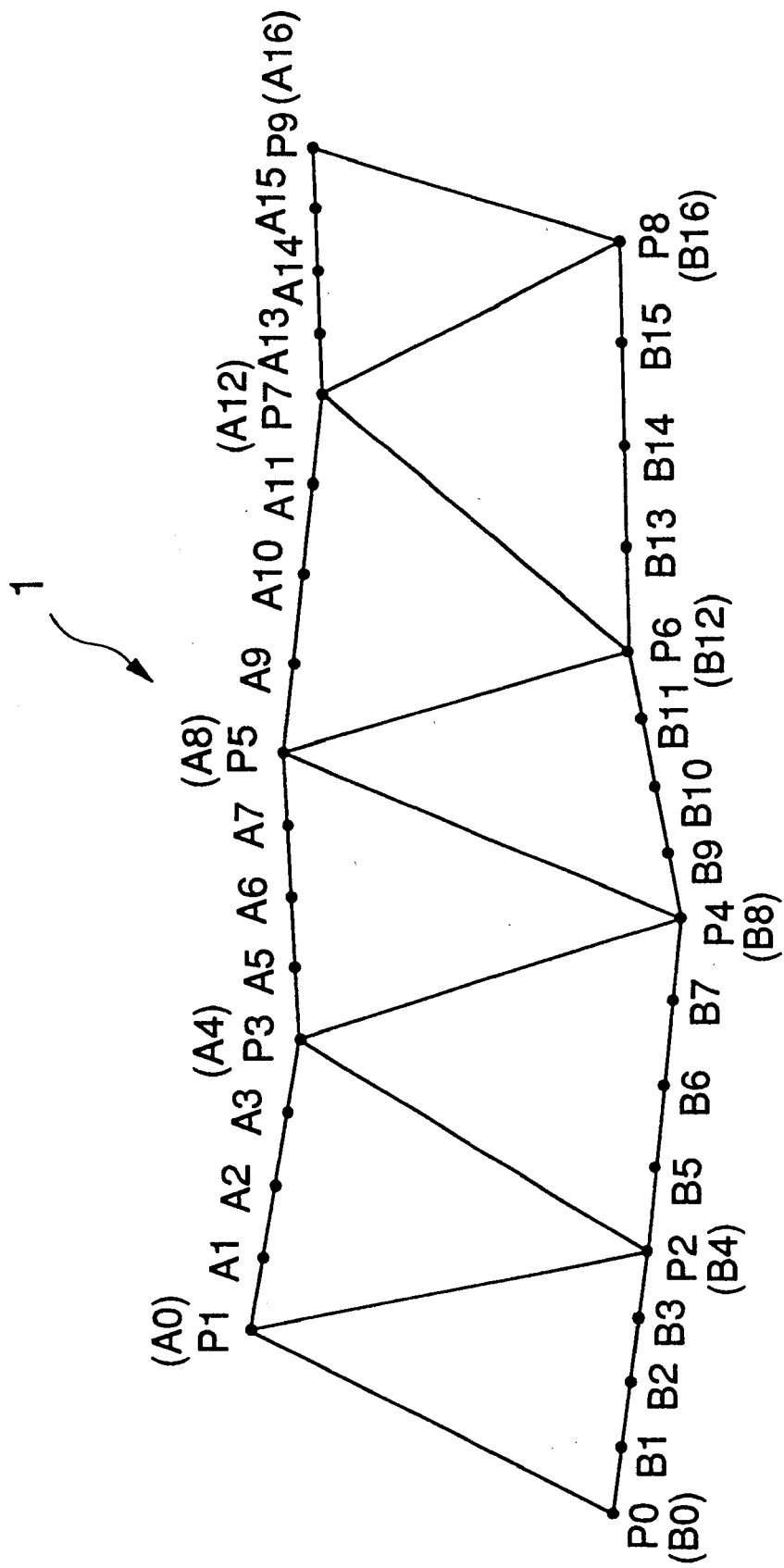
FIG. 15 is a view showing an example for which vertexes are interpolated for a series of vertexes in a strip.

First, in step S1, the CPU 11 reads out coordinate data, color data and normal vectors for vertexes P0 to P9 of a strip 1 from the main memory 15. In step S2, as shown in FIG. 15, the CPU 11 selects a series of vertexes (P1, P3, P5, P7, P9) and a series of vertexes (P0, P2, P4, P6, P8) as longer series of vertexes of the strip 1, and equally divides each section between neighboring two vertexes by four, and new vertexes are interpolated. When each of the vertexes of the series of vertexes (P1, P3, P5, P7, P9) and each of the vertexes interpolated between each neighboring two vertexes are taken to be, from the left of FIG. 15, A0 to A16, and each of the vertexes of the series of vertexes (P0, P2, P4, P6, P8) and each of the vertexes interpolated between each neighboring two vertexes are similarly taken to be, from the left of FIG. 15, B0 to B16, equations for individual vertexes Ai and Bi of the series of vertexes A0 to A16 and the series of vertexes B0 to B16 can be expressed by the following equations, respectively.

$$Ai = \{(4-i\mathrm{MOD}4)A_{(i-i\mathrm{MOD}4)} + (i\mathrm{MOD}4)A_{(i-i\mathrm{MOD}4+4)}\}/4$$

$$Bi = \{(4-i\mathrm{MOD}4)B_{(i-i\mathrm{MOD}4)} + (i\mathrm{MOD}4)B_{(i-i\mathrm{MOD}4+4)}\}/4,$$

where the symbol $\alpha \mathrm{MOD} \beta$ represents that the remainder of $\alpha/\beta$ is taken as the result. For example, the result of 5MOD2 is 1.

Figure 16:
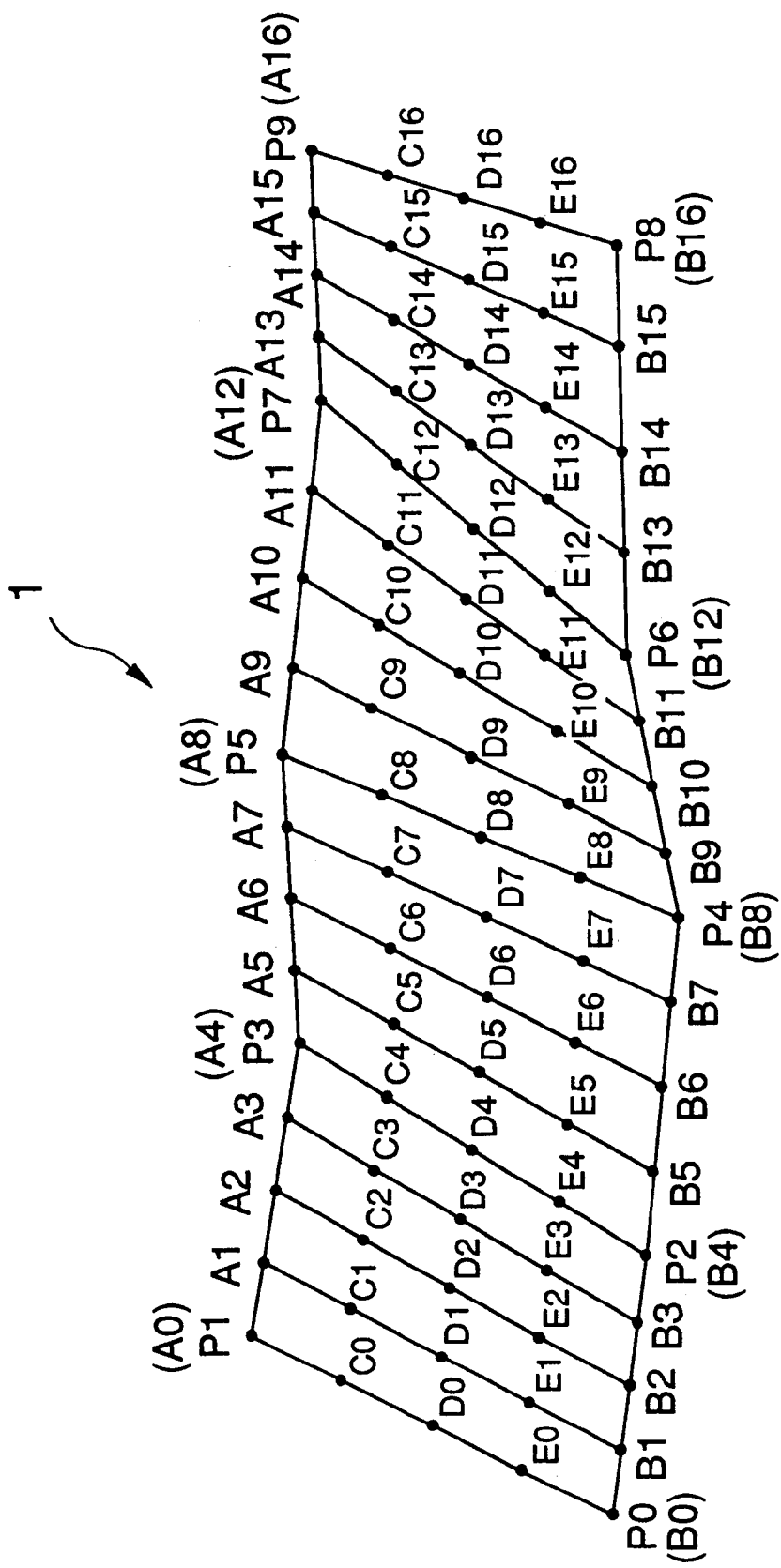
FIG. 16 is a view showing an example where further new vertexes are interpolated for the strip of FIG. 15.

Each of the vertexes of the series of vertexes A0 to A16 are taken to correspond to each of the vertexes of the series of vertexes B0 to B16. In step S3, the CPU 11 divides each of sections between corresponding vertexes of vertexes A0 to A16 and vertexes B0 to B16 into four equal parts, and, as shown in FIG. 16, interpolates further new vertexes C0 to C16, vertexes D0 to D16 and vertexes E0 to E16. Equations expressing individual vertexes at this time are then as follows.

$$Ci = 0.75Ai + 0.25Bi$$

$$Di = 0.5Ai + 0.5Bi$$

$$Ei = 0.25Ai + 0.75Bi$$

Figure 17:
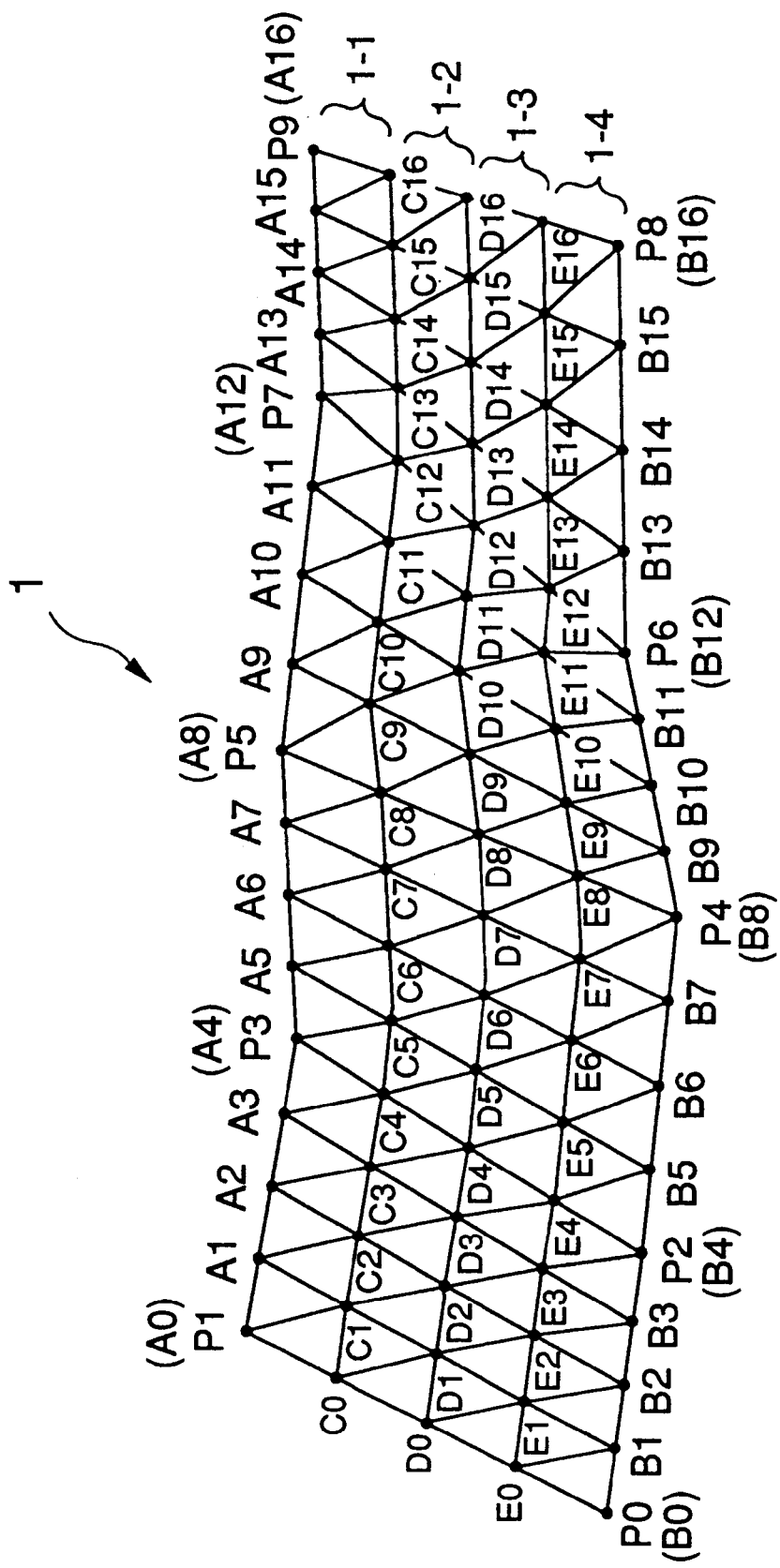
FIG. 17 is a view showing an example where sub-strips are generated using the interpolated vertexes of FIG. 15 and FIG. 16.

Following this, in step S4, the CPU 11 generates sub-strips 1—1 to 1–4 in the direction (horizontal direction of FIG. 17) of the length of the strip 1 using each of the vertexes. In this way, as shown in FIG. 17, the strip 1 is finely subdivided into a total of four sub-strips of a sub-strip 1—1 defined by the series of vertexes A0 to A16 and the series of vertexes C0 to C16, a sub-strip 1–2 defined by the series of vertexes C0 to C16 and the series of vertexes D0 to D16, a sub-strip 1–3 defined by the series of vertexes D0 to D16 and the series of vertexes E0 to E16, and a sub-strip 1–4 defined by the series of vertexes E0 to E16 and the series of vertexes B0 to B16.

Figure 5:
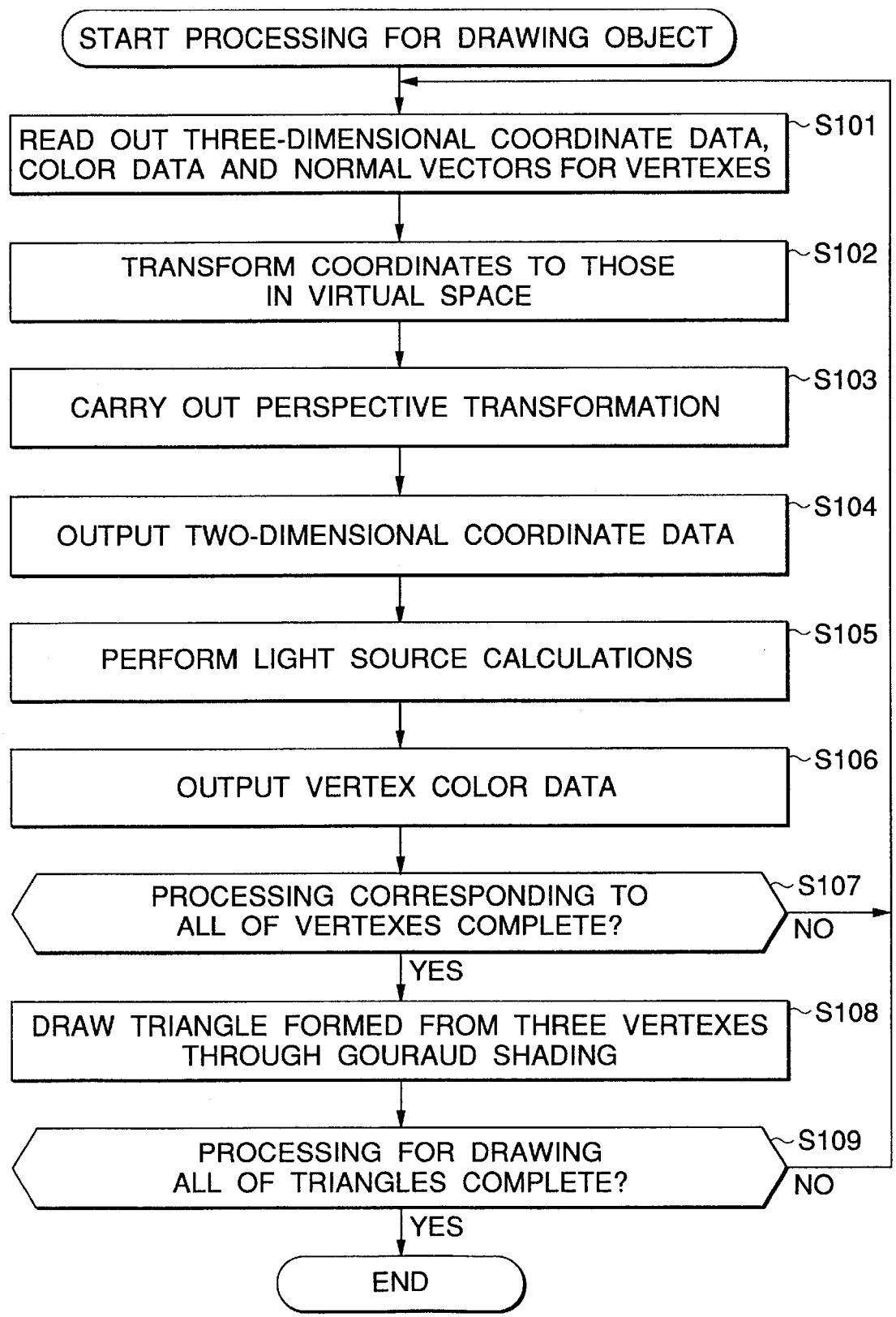
FIG. 5 is a flowchart illustrating processing for drawing an object.
Figure 6:
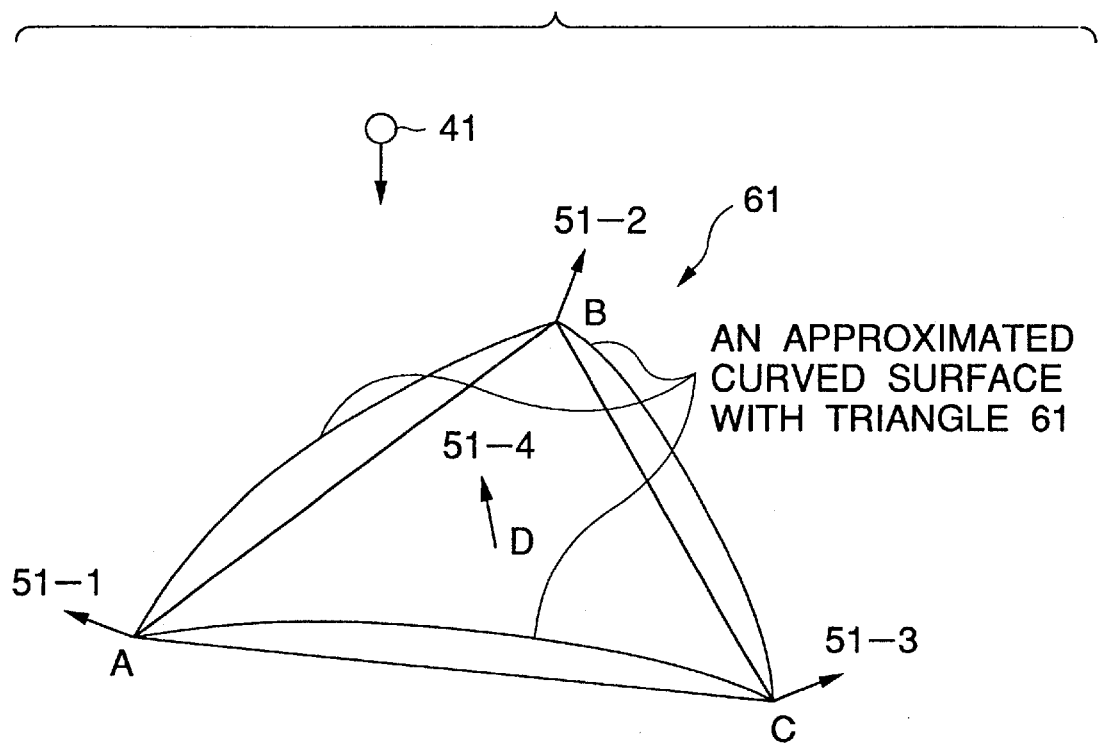
FIG. 6 is a view illustrating the state of a triangle in more detail.
Figure 7:
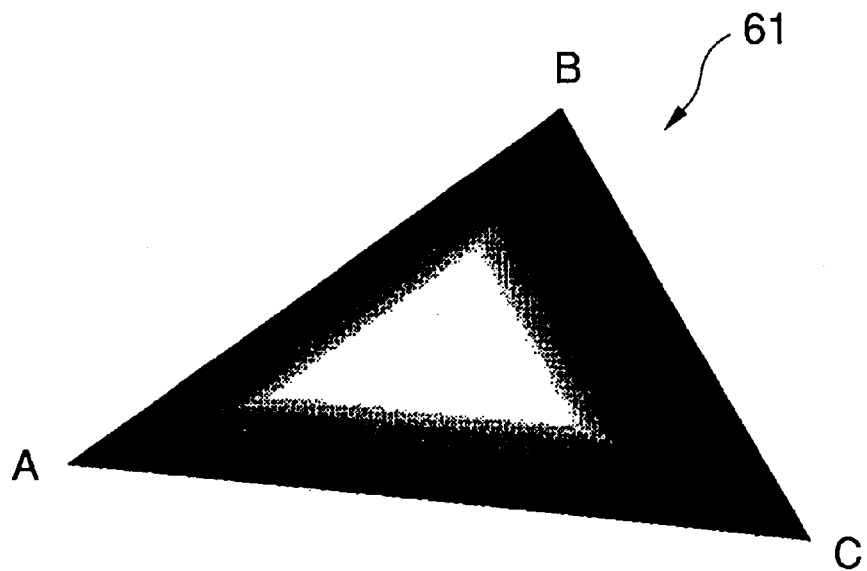
FIG. 7 is a view showing an example where the triangle of FIG. 6 is more accurately processed by Gouraud shading.
Figure 8:
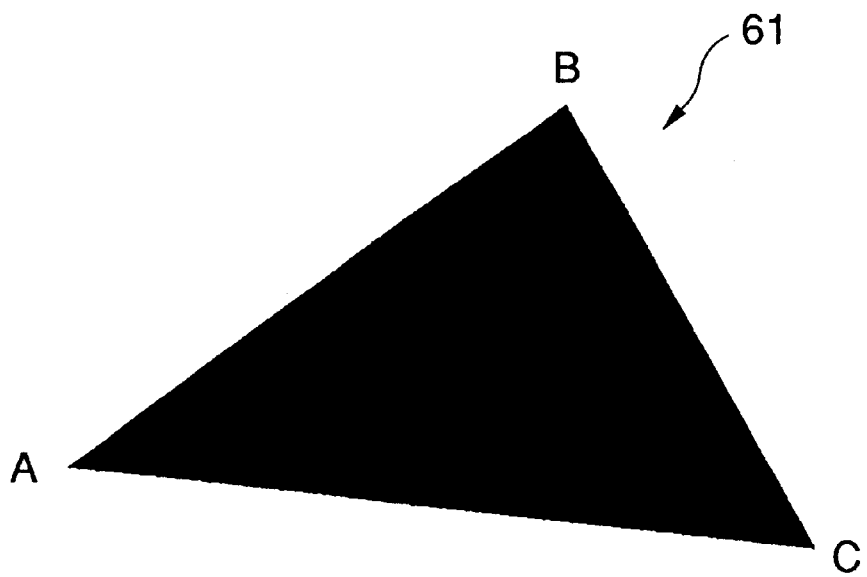
FIG. 8 is a view showing an example where the triangle of FIG. 6 is actually processed by Gouraud shading.
Figure 10A:
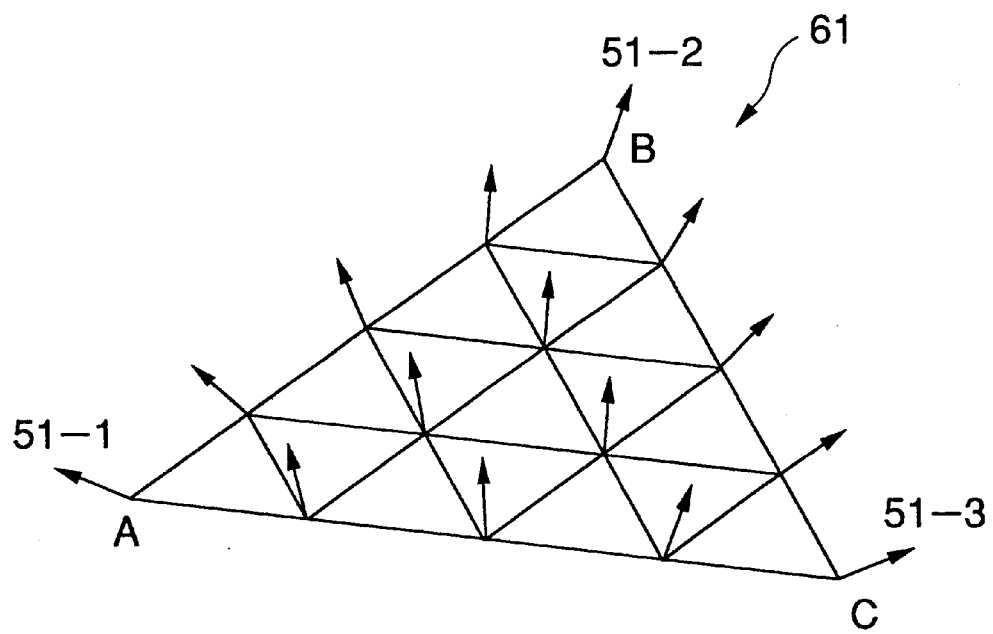
FIGS. 10A and 10B are each a view showing an example where a triangle is drawn in being finely subdivided.
Figure 10B:
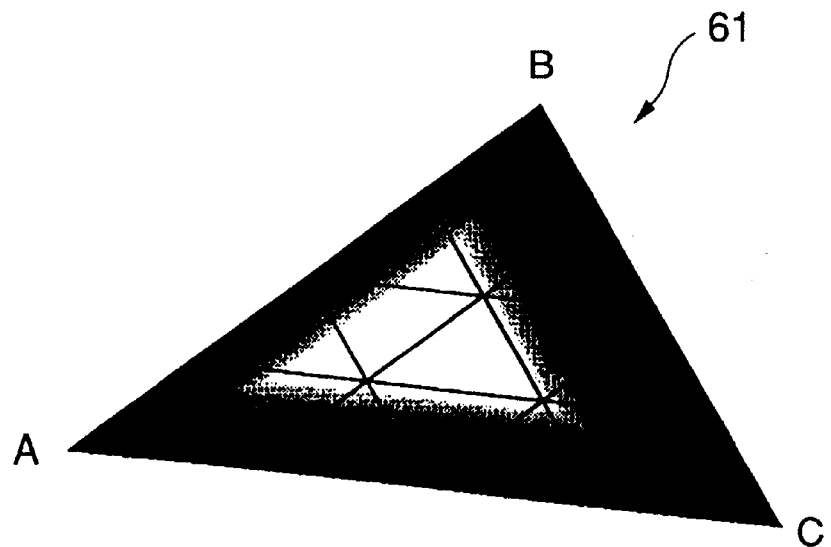
Figure 11:
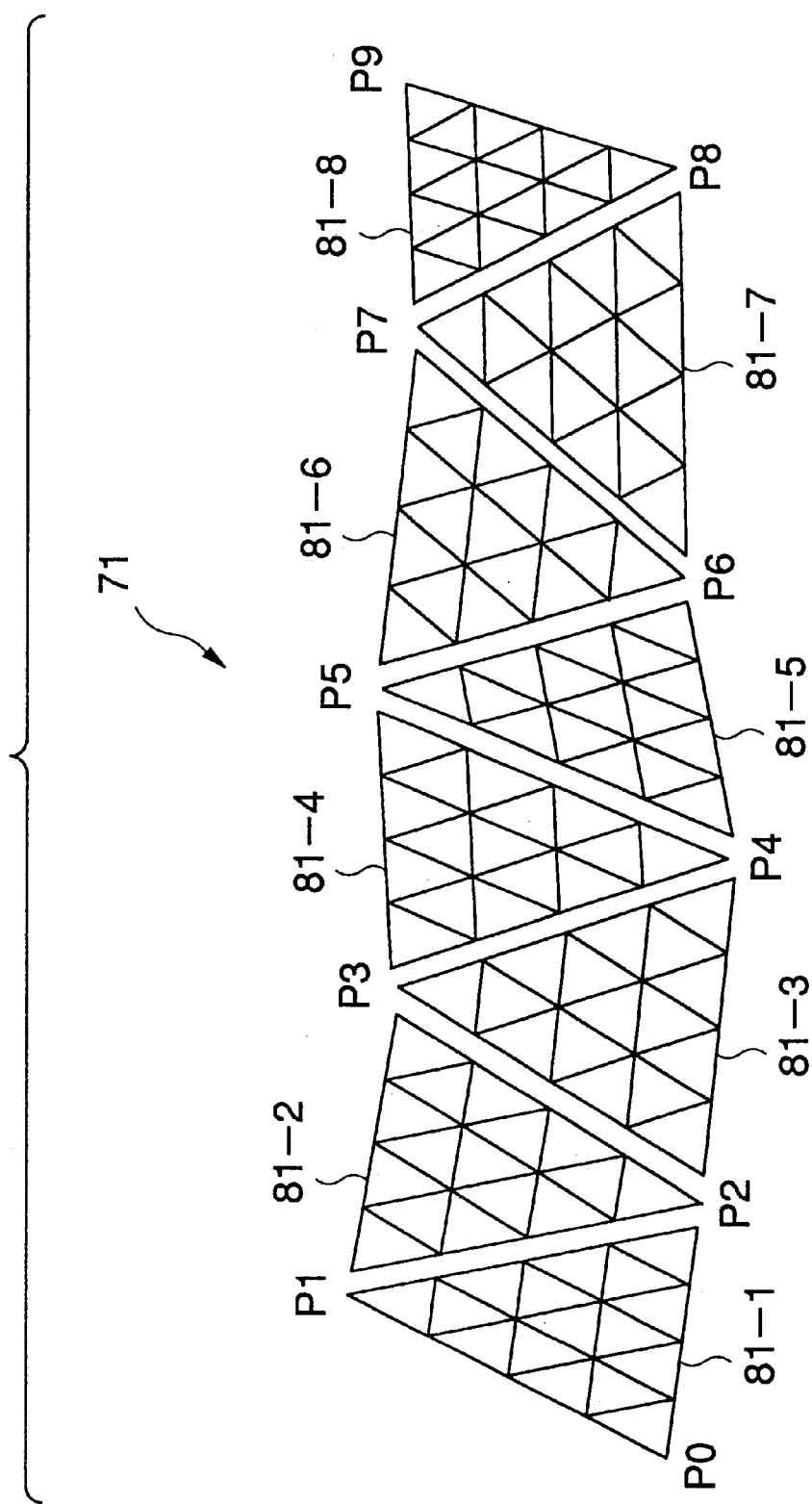
FIG. 11 is a view showing a state where a strip is finely subdivided.
Figure 12:
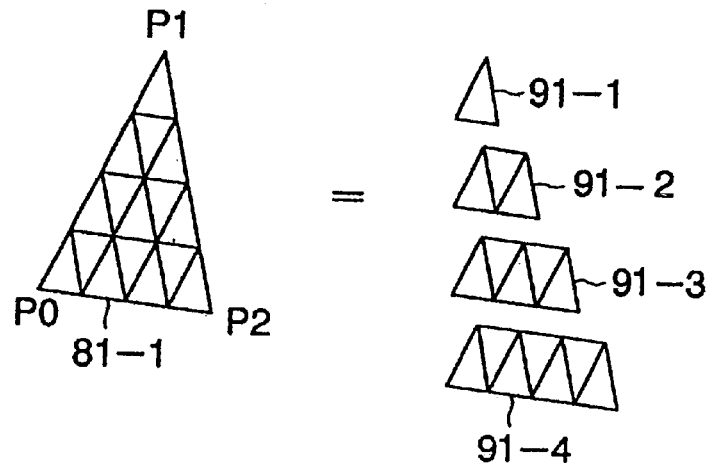
FIG. 12 is a view showing a configuration of one of the sub-triangles comprising the strip of FIG. 11.
Figure 13:
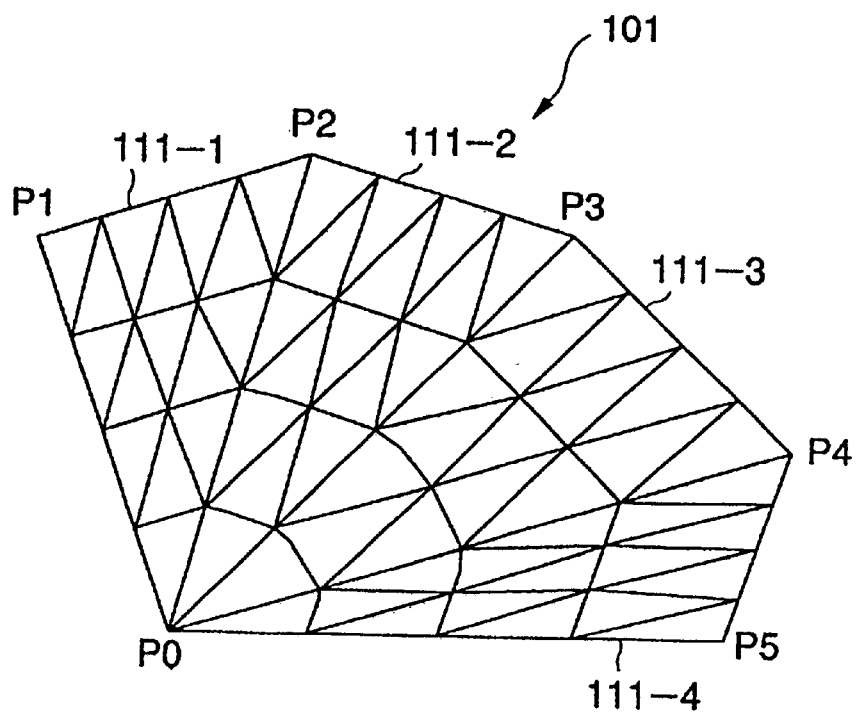
FIG. 13 is a view showing an example where a fan is finely subdivided.

In step S5, the CPU 11 executes drawing processing (this is described in detail with reference to FIG. 5) for every sub-strip with the sub-triangles taken as the units.

In this way, four sub-strips can be sequentially generated using the above method if data for the vertexes A0 to A16 and the vertexes B0 to B16 is stored in the main memory. When the length of the series of vertexes P0 to P9 is taken to be N (=10), a length MA of the series of vertexes A0 to A16 and a length MB of the series of vertexes B0 to B16 become:

$$MA=MB=\{(N/2)-1\}\times 4+1=2\times N-3(=17).$$

A memory capacity C for fine dividing then becomes:

$$C=MA+MB=4\times N-6(=34).$$

Namely, since it is not necessary to store data for all of the vertexes as in the example of prior art, the memory capacity required can be reduced. The length Ns of each sub-strip is also:

$$Ns=4\times N-6(=34).$$

As a result, processing time TS for the strip 1 becomes:

$$TS=\{T1+T0\times(Ns-2)\}\times 4=T1\times 4+T0\times(16N-32)$$

(where T1 and T0 correspond to the case shown in equation (1)). It is therefore possible to carry out processing at a higher speed compared with equation (1) of the prior art.

Figure 18A:
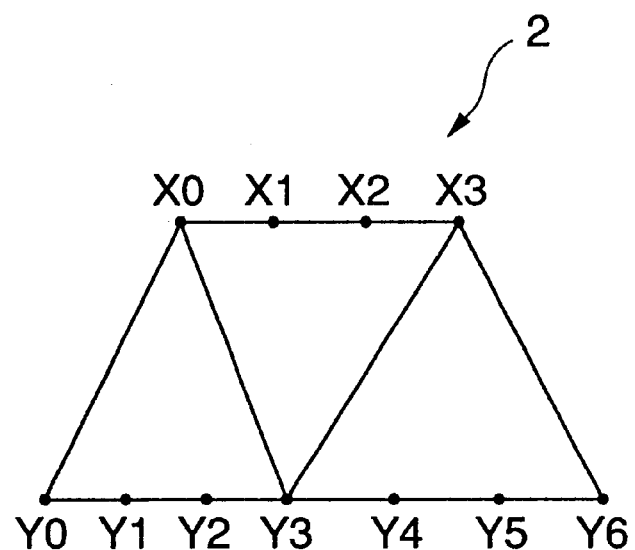
FIG. 18A and FIG. 18B are each a view showing an example of processing for adding a dummy vertex to a strip.
Figure 18B:
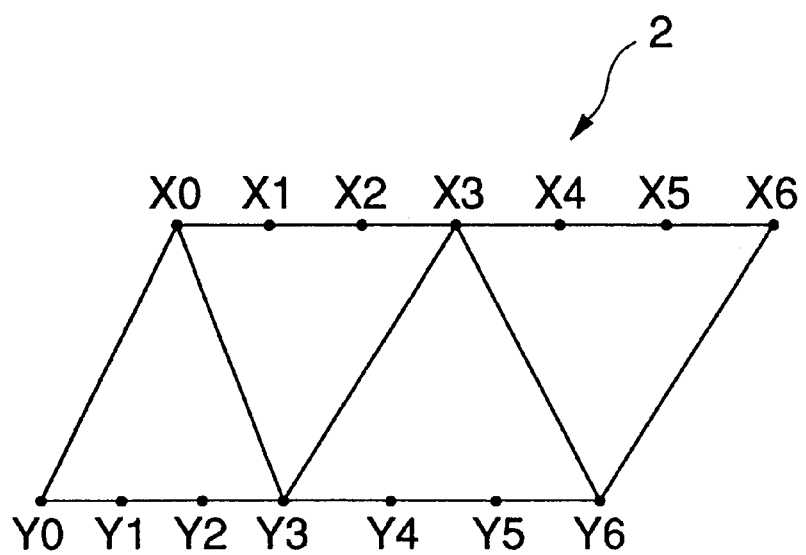

When, for example, as with the strip 2 shown in FIG. 18A, the number of vertexes in the series of vertexes X0 to X3 and that in the series of vertexes Y0 to Y6 does not correspond, the CPU 11 adds a dummy vertex X6 as shown in FIG. 18B and equally divides. the section between this dummy vertex X6 and the vertex X3, thereby making the series of vertexes X0 to X6 and the series of vertexes Y0 to Y6 to correspond and carrying out interpolation.

Figure 19:
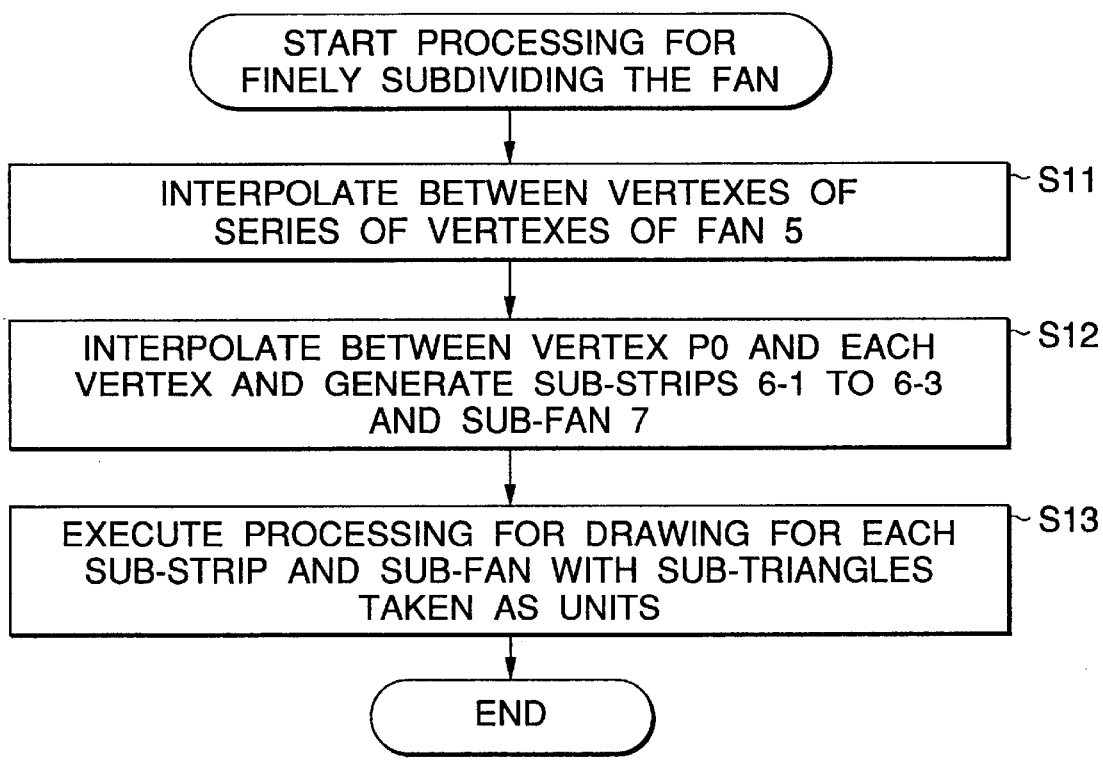
FIG. 19 is a flowchart illustrating an example of processing for finely subdividing a fan.
Figure 20A:
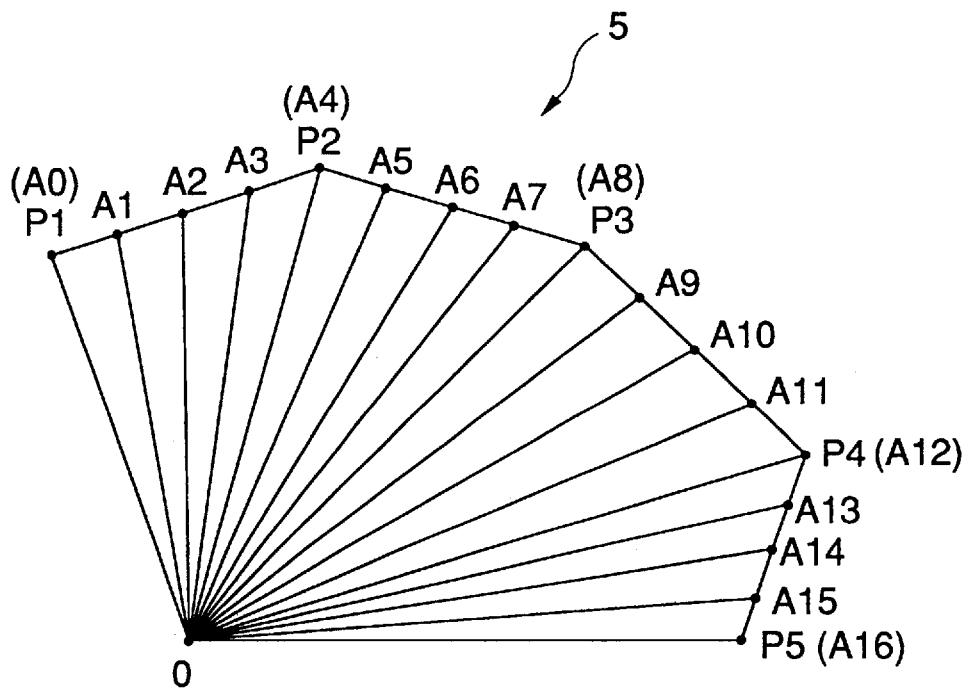
FIG. 20A and FIG. 20B are each a view showing a state where a fan is finely subdivided.
Figure 20B:
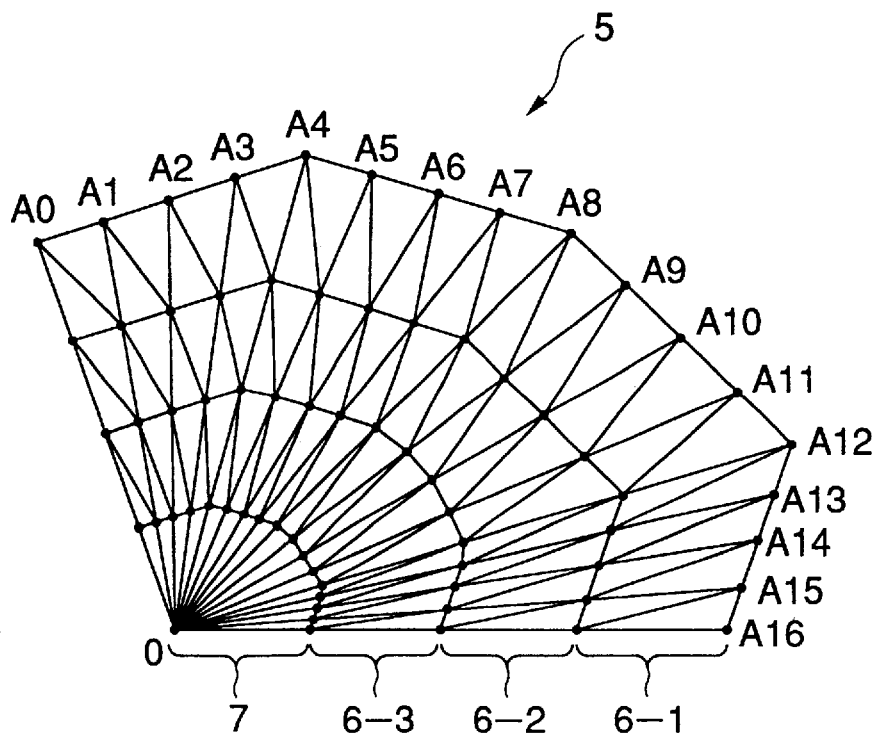

Next, a description is given with reference to FIG. 19 of an example of processing for fine subdividing a fan. In this example, in step S11, the CPU 11 selects the series of vertexes P1 to P5 as a longer series of vertexes of the fan 5 formed of the vertexes P0 to P5. The section between each vertex is then divided into four equal parts and vertexes are interpolated as shown in FIG. 20A. In step S12, as shown in FIG. 20B, the CPU 11 divides the section between the vertex P0 and each of the vertexes into four equal parts and generates sub-strips 6—1 to 6—3 and a sub-fan (sub-triangle fan) 7 by interpolating new vertexes. The CPU 11 then executes drawing processing for every sub-strip and sub-fan with the sub-triangles taken as the units.

As a result of carrying out fine subdividing processing (when interpolation for four equally subdivided parts is carried out) with respect to a fan 5 of length N (=6) in this way, three sub-strips of length 8N−14 (=34) and one sub-fan of length 4N−6 (=18) are formed. Processing time TT in this case becomes:

$$TT=\{T1+T0\times(8N-14)\}\times 3+(T1+T0\times(4N-6)\}=T1\times 3+T0\times(28N-48).$$

Processing can therefore be carried out at a higher speed compared with that with equation (1) of the example of prior art.

In this way, fine subdividing of a strip or fan is carried out. In the embodiment of the present invention, an example is shown where the section between vertexes is divided into four equal parts when interpolating vertexes, but it may be equally subdivided by other numbers.

As transmission media for transmitting programs for carrying out the above processing, in addition to recording media such as magnetic discs, CD-ROMs and solid state memory etc., communication media such as networks and satellites etc. can also be utilized.

As described above, according to the information processing device, information processing method and transmission medium of this invention, the second points are interpolated from the first points, the interpolated second points are combined in the direction of the length of the first information so that the second information is generated. The amount of information for an object to be processed can therefore be reduced and processing can be carried out at a high speed.

What is claimed is:

1. An information processing device for drawing an object in a data format of successive vertices of triangular polygons linked in a ribbon shape to form a strip, comprising:

means for sub-dividing each section between adjacent first vertices of said triangular polygons to generate second vertices;

means for generating third vertices based upon corresponding pairs of said first vertices and corresponding pairs of said second vertices; and means for generating sub strips by interconnecting said first vertices and said second vertices positioned along the same edge of said strip, and by interconnecting said third vertices.

2. The information processing device according to claim 1, wherein said first vertices are series of vertices forming opposite long sides of said strip;

said third vertices being generated by sub-dividing respective linear distances between corresponding pairs of said first vertices and between corresponding pairs of said second vertices; and said third vertices forming a series of vertices interpolating the long sides of said strip.

3. The information processing device according to claim 2, wherein the object is drawn by rendering each of a plurality of sub-triangular polygons forming said sub-strips.

4. An information processing device for drawing an object in a data format of successive vertices of triangular polygons linked in a triangle fan shape, comprising:

means for sub-dividing each section between adjacent first vertices of said triangular polygons to generate second vertices;

means for generating third vertices based upon said first vertices and said second vertices; and means for generating at least one sub-strip and one sub-fan by interconnecting said first and second vertices, and by interconnecting said third vertices.

5. The information processing device according to claim 4, wherein said first vertices are a series of vertices forming an outer long edge of a fan, and a single vertex forming a center of a fan, and being a vertex in each of said triangular polygons;

said third vertices being generated by sub-dividing respective linear distances between each of said first and second vertices along said outer long edge of said fan and said single vertex; and said third vertices forming a series of vertices interpolating the outer long edge and center vertex of said fan.

6. The information processing device according to claim 5, wherein the object is drawn by rendering each of a plurality of sub-triangular polygons forming said at least one sub-strip and said sub-fan.

7. An information processing method for drawing an object in a data format of successive vertices of triangular polygons linked in a ribbon shape to form a strip, comprising the steps of:

sub-dividing each section between adjacent first vertices of said triangular polygons to generate second vertices;

generating third vertices based upon corresponding pairs of said first vertices and corresponding pairs of said second vertices; and generating sub strips by interconnecting said first vertices and said second vertices positioned along the same edge of said strip, and by interconnecting said third vertices.

8. The information processing method according to claim 5, wherein said first vertices are series of vertices forming opposite long sides of said strip;

said third vertices being generated by sub-dividing respective linear distances between corresponding pairs of said first vertices and between corresponding pairs of said second vertices; and said third vertices forming a series of vertices interpolating the long sides of said strip.

9. The information processing method according to claim 8, wherein the object is drawn by rendering each of a plurality of sub-triangular polygons forming said sub-strips.

10. An information processing method for drawing an object in a data format of successive vertices of triangular polygons linked in a triangle fan shape, comprising:

sub-dividing each section between adjacent first vertices of said triangular polygons to generate second vertices;

generating third vertices based upon said first vertices and said second vertices; and generating at least one sub-strip and one sub-fan by interconnecting said first and second vertices, and by interconnecting said third vertices.

11. The information processing method according to claim 10, wherein said first vertices are a series of vertices forming an outer long edge of a fan, and a single vertex forming a center of a fan, and being a vertex in each of said triangular polygons;

said third vertices being generated by sub-dividing respective linear distances between each of said first and second vertices along said outer long edge of said fan and said single vertex; and said third vertices forming a series of vertices interpolating the outer long edge and center vertex of said fan.

12. The information processing method according to claim 11, wherein the object is drawn by rendering each of a plurality of sub-triangular polygons forming said at least one sub-strip and said sub-fan.

* * * * *